United States Patent
Garusi et al.

(10) Patent No.: US 8,444,860 B2
(45) Date of Patent: May 21, 2013

(54) METHOD AND APPARATUS FOR DISINFECTING HOT WATER

(75) Inventors: Gianfranco Garusi, Brescia (IT); Francesco Garusi, Brescia (IT)

(73) Assignee: Sanipur S.r.l., Flero (IT)

( * ) Notice: Subject to any disclaimer, the term of this patent is extended or adjusted under 35 U.S.C. 154(b) by 346 days.

(21) Appl. No.: 12/658,874

(22) Filed: Feb. 17, 2010

(65) Prior Publication Data
US 2010/0206815 A1 Aug. 19, 2010

(30) Foreign Application Priority Data
Feb. 17, 2009 (IT) .............................. MI2009A0205

(51) Int. Cl.
*C02F 1/76* (2006.01)

(52) U.S. Cl.
USPC ............ 210/739; 210/752; 210/754; 210/764

(58) Field of Classification Search .................. 210/754, 210/755, 764, 765, 766, 739, 752, 192, 167.11, 210/195.1, 199, 205, 209
See application file for complete search history.

(56) References Cited

U.S. PATENT DOCUMENTS

| | | | | |
|---|---|---|---|---|
| 4,614,595 A * | 9/1986 | Azzarella et al. | ............. | 210/754 |
| 6,143,184 A * | 11/2000 | Martin et al. | ................. | 210/756 |
| 2007/0045199 A1* | 3/2007 | Mayer et al. | ................. | 210/764 |

FOREIGN PATENT DOCUMENTS

JP 2008 264678 11/2008

OTHER PUBLICATIONS

Weintraub J.M. et al.—"*Legionella* reduction after conversion to monochloramine for residual disinfection"—American Water Works Association—vol. 100, No. 4—Apr. 2008—pp. 129-139—XP008112647.

Moore, Matthew R. et al.—"Introduction of monochloramine into a Municipal Water System: Impact on Colonization of Buildings by *Legionella* spp"—Applied and Environmental Microbiology—vol. 72, No. 1—Jan. 2006—pp. 378-383—XP002547639.

Search Report—Italian Application No. MI2009A000205—Feb. 17, 2009.

\* cited by examiner

*Primary Examiner* — Lucas Stelling
(74) *Attorney, Agent, or Firm* — R. Neil Sudol; Coleman Sudol Sapone, P.C.

(57) ABSTRACT

A method for disinfecting hot water, in recirculating systems, includes producing monochloramine directly in hot water, at a temperature higher than 30° C. in a hot water circulating system The method is implemented by an apparatus for disinfecting hot water, in recirculating systems, having a main hot water circuit, one or more water delivery points and a water feed point, adapted to maintain the circulating water volume constant, a drawing point, where a portion of water of the main circuit is drawn and an intake point where water added with monochloramine is reintroduced into the main circuit; and an adding circuit formed between the drawing point and the intake point; the adding circuit has a control and adding system, adapted to add monochloramine producing reagents to the hot water.

5 Claims, 1 Drawing Sheet

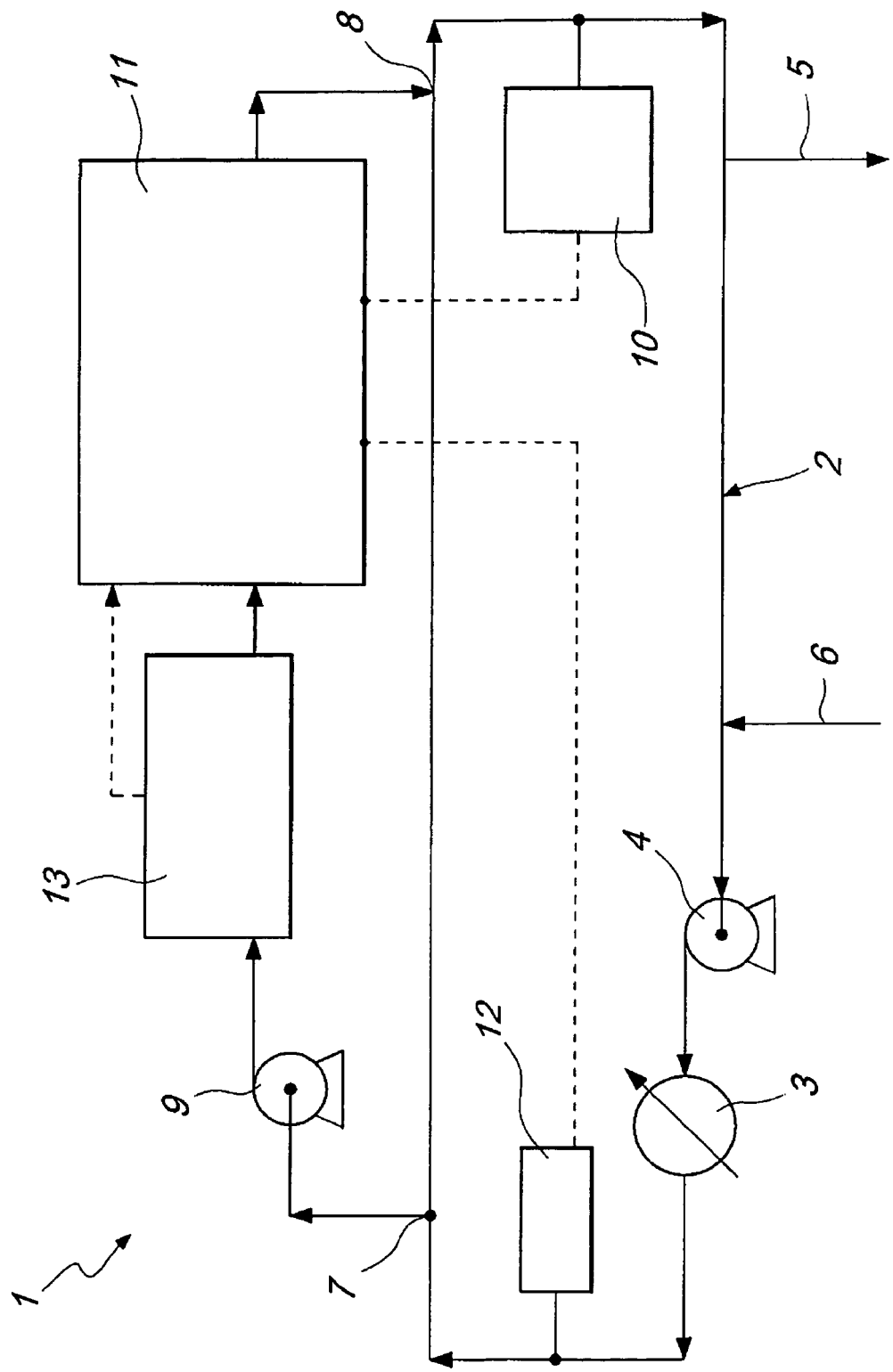

METHOD AND APPARATUS FOR DISINFECTING HOT WATER

BACKGROUND OF THE INVENTION

The present invention relates to a method and an apparatus for disinfecting hot water, particularly in recirculating systems such as sanitary hot water distribution systems, cooling towers, etc.

As is known, microorganisms that are dangerous for human health, so called pathogens, may dwell in hot water systems for hygienic and sanitary uses or technical and industrial applications.

More recently, it has been discovered that a severe disease, caused by bacteria that are present in hot water, is legionellosis, which affects human beings with a high mortality rate, even above 30%, especially in hospital environments.

Various species of *Legionella* are known that can attack human beings; however, the most widespread and dangerous one appears to be *Legionella Pneumophila*, which is responsible for severe respiratory disorders, with symptoms similar to pneumonia, but very dangerous especially for immunosuppressed subjects.

In nature, those bacteria occur in water and at moderate temperatures, not higher than 30° C., and their concentration is very limited and is to be considered normal.

The situation in hot water, up to 65° C. approximately, is different, because in those cases *Legionella* proliferates significantly, reaching concentrations that are dangerous for human health.

Therefore, hot water used by human beings for hygienic and technical uses, at 45-50° C., in baths, showers, cooling towers, etc., can become a dangerous source of contamination.

Those phenomena have become apparent mainly in hotels, hospitals, ships, spas and the like, where hot water is kept within the optimal conditions for the proliferation of the *Legionella* microbe.

Faced with a problem whose extent is cause for concern, various organizations, including the World Health Organization, the European Union, the United States' CDC (Centers for Disease Control and Prevention), have prepared guidelines for preventing such phenomenon.

The scientific literature on the subject reports several methods for contrasting *Legionella* effectively and attempting to sanitize contaminated systems.

Some of the best known are listed hereafter.

Formally, the simplest method appears to be to raise the temperature of the water to 70+80° C. for a few minutes every day, so as to eliminate bacterial colonies by hyperthermia or thermal shock.

However, in the terminal drawing points, that operate discontinuously, the temperature drops locally below 60° C., eliminating the effectiveness of such method.

Another method involves the use of UV lamps. Such method is however difficult to implement in practice because it is difficult to install the lamps. Also, the large number of drawing points, and therefore of lamps, would entail considerable costs that are not always possible to meet.

Among the conventional chemical methods, water chlorination would appear to be useful both for initially purifying the water and for preserving its sterility.

Such conventional method comprises a first step of hyperchlorination, up to 50 mg/l of chlorine, in cold water, and a subsequent step of weaker but continuous chlorination in hot water, from 1 to 3 mg/l.

Unfortunately, such method has revealed the forming of chlorinated organic by-products of confirmed toxicity (THM).

The use of hypochlorites is not recommendable, because the biofilm is not attacked and destroyed significantly.

The use of recent water potabilization techniques, based on the use of chlorine dioxide, an oxidizer that prevents the forming of organic chlorinates, would appear to be more favorable.

Also, it been proposed to use hydrogen peroxide in association with metallic ions; however, in addition to an as yet unproven effectiveness, ion exchange phenomena in the ducts prevent their use in galvanized iron pipes, which are very commonly used in water distribution systems.

According to recent studies, monochloramine appears to be effective in treating potable water against the proliferation of *Legionella* and in preserving the water's healthiness.

However, the conventional methods implementing the monochloramine have been devised for waterworks and are not suitable for systems where water is at least partially recirculated and are not suitable for dosing the monochloramine into hot water.

As very well known to the expert person, monochloramine decomposes in a much faster way in hot water than in cold water. Therefore, when operating in a recirculation system, it is necessary to restore the optimal level of decomposed monochloramine without accumulating excessive quantities of by-products, namely ammonium ions.

JP-2008 264678 discloses the use of monochloramine for preventing the insurgence of the *Legionella* bacteria in water in a tank.

Weintraub J. M. et al.: "*Legionella* reduction after conversion to monochloramine for residual disinfection" American Water Works Association, vol. 100, no. 4, April 2008, pages 129-139 (XP008112647 ISSN: 0003-150X) and Matthew R. Moore et al.: "Introduction of monochloramine into a municipal water system: Impact On Colonization of buildings by *Legionella* spp." Applied And Environmental Microbiology, vol. 72, no. 1, January 2006, pages 378-383 (DOI: 10.1128), disclose disinfecting methods for water systems.

OBJECTS OF THE INVENTION

The aim of the present invention is to provide a method for disinfecting hot water circulating systems that overcomes the drawbacks of the cited prior art.

Within such aim, an object of the invention is to provide a method that ensures a constant quantity of monochloramine and prevents the accumulation of ammonium ions.

A further object of the invention is to provide a method that can be advantageously applied to sanitary hot water networks with recirculation, wherein water is disinfected and wherein the unused water is recirculated and, if necessary, added with further disinfectant in order to maintain the disinfectant concentration in an optimal concentration range.

A further object of the invention is to provide a reliable and safe method.

SUMMARY OF THE INVENTION

This aim, these objects and others that will become better apparent hereinafter are achieved by a method for disinfecting hot water, in recirculating systems, characterized in that it comprises producing monochloramine directly in hot water, at a temperature higher than 30° C. in a hot water circulating system.

The above aim and objects are also achieved by an apparatus for disinfecting hot water, in recirculating systems, characterized in that it comprises a main hot water circuit, one or more water delivery points and a water feed point, adapted to maintain the circulating water volume constant, a drawing point, where a portion of water of said main circuit is drawn and an intake point where water added with monochloramine is reintroduced into said main circuit; and adding circuit formed between said drawing point and said intake point; said adding circuit comprising a control and adding system, adapted to add monochloramine producing reagents to said hot water.

BRIEF DESCRIPTION OF THE DRAWING

Further characteristics and advantages of the invention will be more apparent by the following description of an embodiment of the invention, illustrated, by way of example in the drawing.

The sole FIGURE of the drawing is a diagram of the apparatus according to the present invention applied to a water circulating system.

DETAILED DESCRIPTION

After extensive research, the present inventors have determined an actual inactivation of the bacterial load in hot water at the temperatures at which the risk of *Legionella* proliferation is highest.

Rigorous experimental research has allowed the present inventors to also ascertain that monochloramine acts in depth on the biofilm, eliminating microbial contamination.

We observed the effectiveness of the treatment with monochloramine in hospitals, where analyses would find *Legionella* loads and high loads of total active biomass, which ranged between 15 and 20 $pg_{ATP}$/ml, at the sinks and showers.

By keeping a constant value of 2 ppm of monochloramine, directly injected in the hot water circuit, without initial shock, those values dropped below 1 $pg_{ATP}$/ml, remaining stable over time.

At the same time, the *Legionella* load, initially $10^6$ ufc/l, dropped to less than 1000 ufc/l and in many cases to less than 100 ufc/l.

The biofilm also underwent a significant reduction in *Legionella*, passing from over 10,000 ucf/cm² to less than 10 ucf/cm², that is a drop of over a thousand times.

The monochloramine used for the disinfection of water is synthesized by the following reaction:

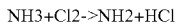

$$NH_3 + Cl_2 \rightarrow NH_2 + HCl$$

and requires correct dosage of the reagents.

With procedural variations, ammonia, which is not simple to handle, can be advantageously replaced by ammonia salts that are easier to use.

Likewise, chlorine gas can be replaced with hypochlorites, which are more practical in use.

In the disinfection of hot water, according to the present invention, monochloramine is introduced in the water circuit with an optimal concentration, i.e. 1 to 3 ppm, in order to destroy also the bacterial loads of the biofilm.

The method according to the invention is applied advantageously to sanitary hot water networks with recirculation, wherein the water is disinfected and the amount of water that is not drawn and returns to circulation can, if necessary, receive the addition of further monochloramine to keep its disinfectant concentration in the optimal range.

According to the present invention, the method comprises the use of monochloramine in the disinfection of water at a temperature higher than 30° and preferably between 35° C. and 65° C.

The monochloramine is obtained by reaction between chlorine and hypochlorites and ammonia or ammonia salts for use for eradication of *Legionella* from hot water.

The monochloramine is used in bacterial sanitation and to keep the water in conditions of microbiological safety.

The monochloramine is used in the hot water at concentrations comprised between 0.1 and 10 mg/l, preferably between 1 and 3 mg/l.

The introduction of monochloramine directly into the hot water circuit requires an accurate operative method.

While it is important to prevent the accumulation of monochloramine and of its decomposition products in the water circuit, it is nevertheless necessary to keep an optimal constant value of 1 to 3 mg/l, as determined experimentally.

According to the present method, the pH of the hot water used for the production of monochloramine should stay in an accurate range in order to ensure the desired reaction yield. According to the present invention, the hot water pH should be in the range between 7 and 9, preferably between 7.4 and 8.4.

A slight excess of chlorine/hypochlorite is useful for restoring the level of monochloramine, which has degraded because of the rapid reaction with the ammonium ions liberated by the same decomposition.

The apparatus according to the present invention is capable of independently dosing the reagents adapted to produce monochloramine, in order to maintain the correct ratio of Cl/N for synthesizing the monochloramine, and in order to use the by-products of the decomposition of the monochloramine, namely the ammonium ions, restoring the correct concentration of monochloramine.

The apparatus for disinfecting hot water, particularly in recirculating systems, according to the present invention, globally designated by the reference numeral 1, comprises a main hot water circuit 2, a heat exchanger 3, a pumping means 4, one or more water delivery points 5, and a water feed point 6 adapted to maintain the circulating water volume constant.

The circuit 2 may include a tank or reservoir, which is not shown in the drawings.

According to the present invention, the apparatus 1 comprises a drawing point 7, where a portion of water of the main circuit is drawn for adding monochloramine, and an intake point 8 where the water added with monochloramine is reintroduced into the main circuit 2.

An adding pump means 9 circulates the water in the adding circuit formed between the drawing point 7 and the intake point 8.

A monochloramine measuring system 10 measures the title of monochloramine in the main circuit 2, before the delivery points 5. The monochloramine measuring system 10 is electrically connected with a control and adding system 11.

The control and adding system 11 comprises an electronic control means and a monochloramine reagent feed means.

The apparatus may be provided with means for measuring the redox potential and the concentration of free chlorine.

An ammonium measuring means 12 measures the free ammonium in the main circuit 2 and is electrically connected to the electronic control means of the control and adding system 11.

In the adding circuit, a pH correction means 13 is connected upstream to the control and adding system 11. The pH correction means 13 ensures that the correct value of pH is maintained within the selected range.

The control and adding system 11 is provided with a reagent dosing means and is controlled by its electronic control means.

The electronic control means controls the monochloramine reagents feed means, in order to maintain a selected concentration of monochloramine and to limit the concentration of the by-products of its reaction, namely the ammonium ion.

The electronic control means controls the monochloramine reagents feed means, according to the operating parameters of the apparatus, i.e. the quantity of delivered water, temperature, main circuit capacity, and according to the measurements of the sensors which include pH, monochloramine concentration, ammonium ion concentration, redox potential, free chlorine.

The apparatus according to the invention is capable of ensuring a constant presence of monochloramine in all the sections of the hot water main circuit in the selected concentration.

The apparatus according to the invention is also capable of ensuring the formation of the monochloramine exclusively, by controlling the pH level.

The apparatus according to the invention is also capable of controlling the concentration of the by-products, namely the ammonium ions, by controlling the addition of the monochloramine reagents e by constantly measuring the parameters of the process.

In practice it has been found that the invention achieves the intended aim and objects, a method having been provided which is significantly improved with respect to traditional methods for the disinfection of sanitary hot water.

The apparatus according to the invention make it possible to add the monochloramine directly into a hot water circuit, while controlling the monochloramine concentration and preventing the excessive accumulation of by-products, namely ammonium ions.

The invention claimed is:

1. A method for disinfecting hot water in recirculating systems, comprising producing monochloramine directly in hot water at a temperature between about 30° C. and about 65° C. in a hot water circulating system, the producing of said monochloramine including adding chlorine or chlorites and ammonia or ammonia salts to said hot water; maintaining said monochloramine produced in said hot water at a constant concentration throughout the entirety of said hot water circulating system; controlling concentrations of by-products, including ammonium ion, of a reaction between said chlorine or chlorites and said ammonia or ammonia salts by continuously or constantly monitoring levels of monochloramine and ammonium in said hot water circulating system and, depending on detected levels of monochloramine and ammonium in said hot water circulating system., regulating the addition of said chlorine or chlorites and said ammonia or ammonia salts; and adjusting the pH of said hot water prior to or upstream of the adding of said chlorine or chlorites and said ammonia or ammonia salts.

2. The method according to claim 1 wherein said constant concentration of said monochloramine in said hot water is maintained in a range between 0.1 and 10 mg/l.

3. The method according to claim 1, wherein said constant concentration of said monochloramine in said hot water is maintained in a range between 1 and 3 mg/l.

4. The method according to claim 1 wherein said constant concentration of said monochloramine in said hot water is maintained continuously during operating of said hot water circulating system.

5. The method according to claim 1 wherein said monitoring includes operating a monochloramine measuring device and a separate ammonium measuring device and wherein regulating the addition of said chlorine or chlorites and said ammonia or ammonia salts includes operating a control and adding system having an electronic control, further comprising transmitting electrical signals from said monochloramine measuring device and said ammonium measuring device to said electronic control.

* * * * *